Patented Apr. 24, 1951

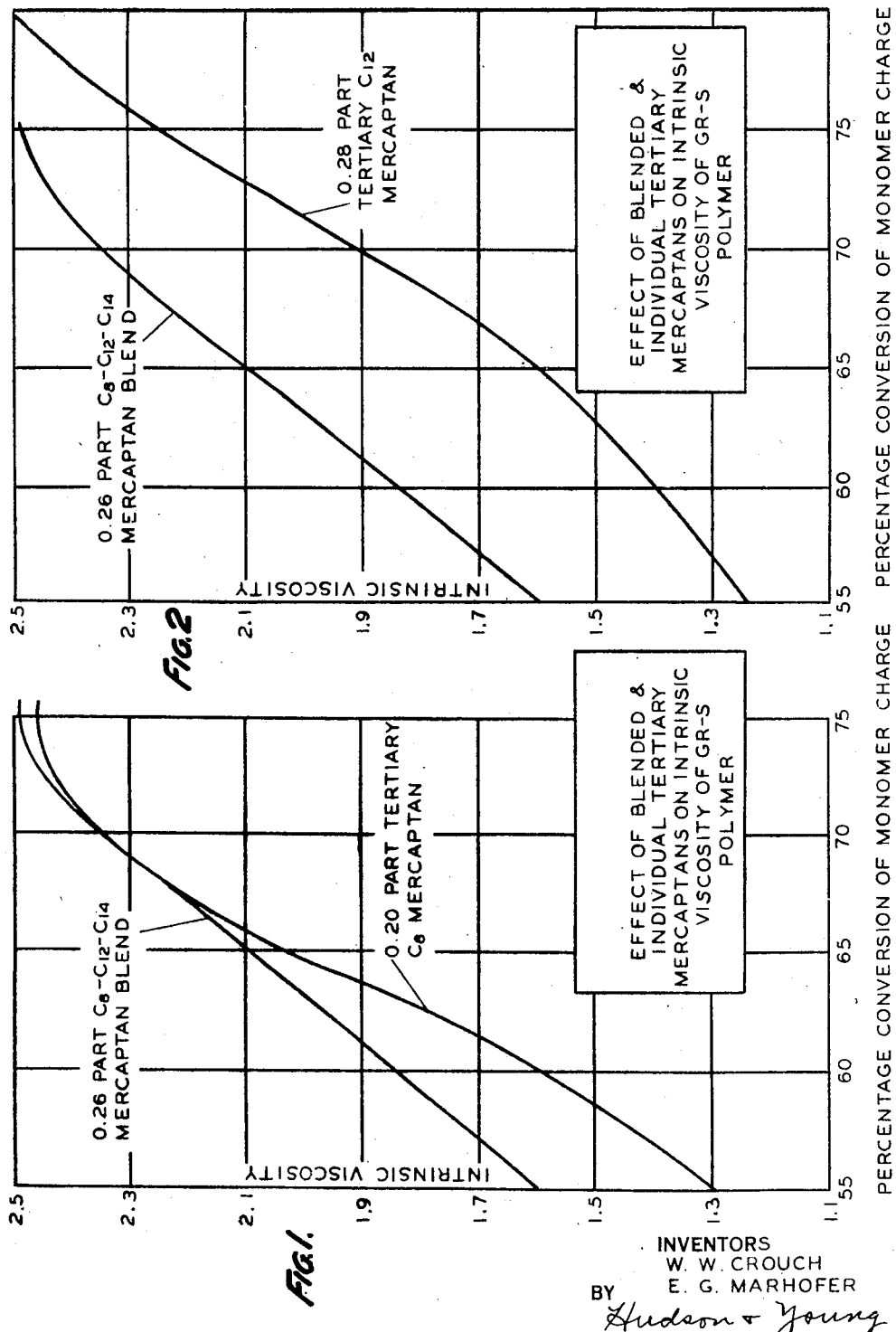

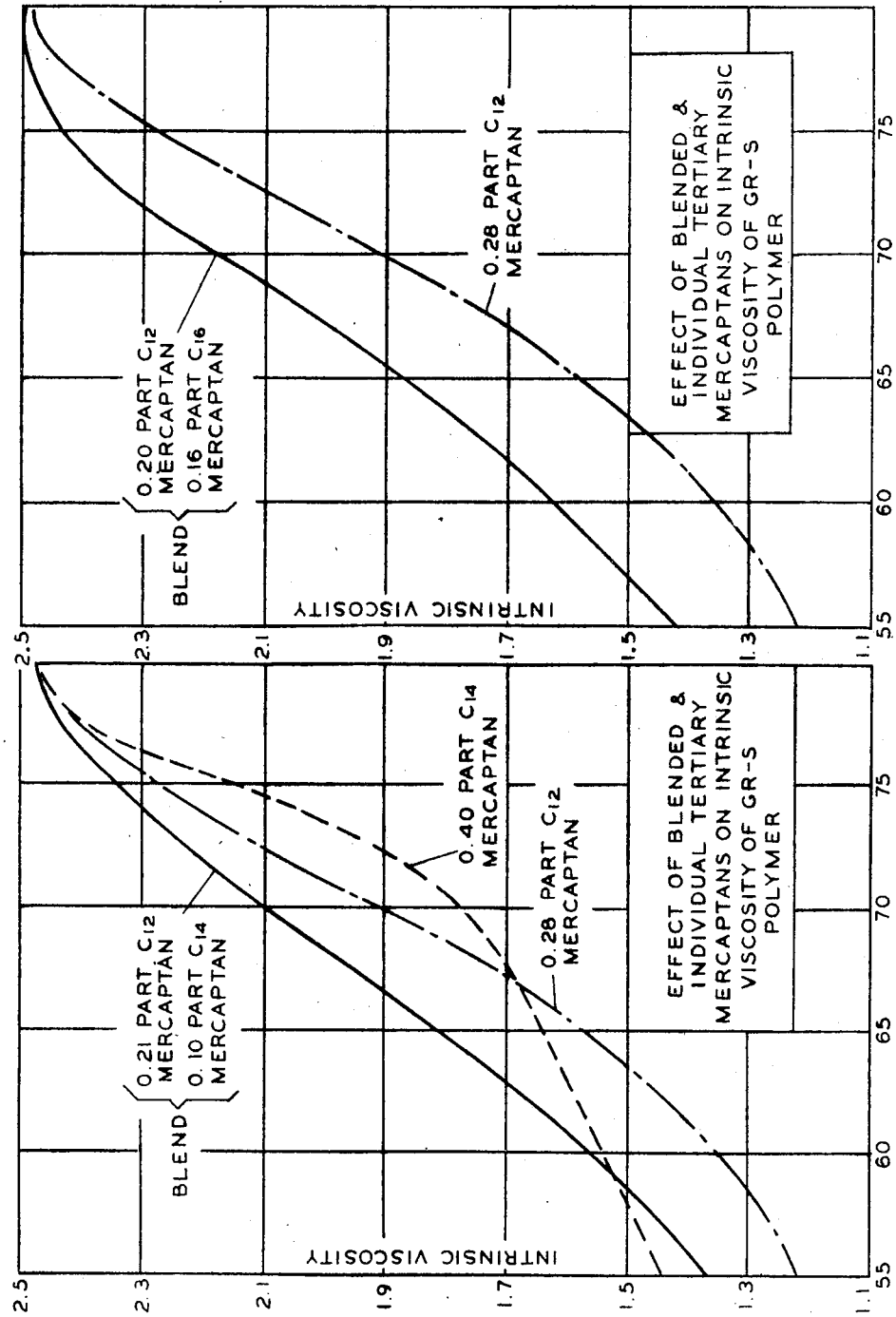

2,549,962

UNITED STATES PATENT OFFICE 2,549,962

USE OF A BLEND OF TERTIARY ALKYL MERCAPTANS IN EMULSION POLYMERIZATION

Willie W. Crouch, Bartlesville, Okla., and Edwin G. Marhofer, Phillips, Tex., assignors to Phillips Petroleum Company, a corporation of Delaware Original application February 2, 1945, Serial No. 575,819. Divided and this application September 11, 1950, Serial No. 184,278

1 Claim. (Cl. 260—84.3)

This invention relates to the production of high molecular weight polymers. It is particularly applicable to the production of synthetic rubber by the polymerization of polymerizable organic compounds in an aqueous emulsion. In one of its more specific aspects this invention relates to the use of mixtures of certain mercaptans as modifying agents in the emulsion polymerization of butadiene-styrene and other related comonomer systems whereby the quality of the polymerizates is greatly improved. This application is a division of our copending application Serial No. 575,819 filed February 2, 1945.

Synthetic rubber is made by polymerization of polymerizable organic compounds under controlled polymerization conditions. The term synthetic rubber is used broadly to include the polymerizates of olefins, diolefins, styrene and its derivatives, alkyl esters of acrylic and alkacrylic acids (such as methyl methacrylate), and other compounds having at least one active $CH_2=C=$ group. These compounds are polymerized alone or in admixture with one another to form products having some of the characteristic properties of synthetic rubber. When a mixture of two or more of these compounds is subjected to polymerization conditions, a copolymer is formed in which the components form high molecular weight molecules by the linking together of the different individual component monomers. We have found that the synthetic product produced by the polymerization of a polymerizable organic compound is improved by the addition of a blend of tertiary aliphatic mercaptans to the monomeric compound to be polymerized prior to the polymerization thereof. This is particularly effective in the polymerization of butadiene in an aqueous emulsion with suitable comonomers, for example, styrene, derivatives of styrene containing an active $CH_2=C=$ group, acrylonitrile, methacrylonitrile, methyl acrylate, methyl methacrylate, etc., to form copolymers. Buna-S (or GR-S) is an example of the most important synthetic rubber so produced at the present time.

It is well known that copolymers of the Buna-S type are unsuited for use as synthetic rubber unless the emulsion polymerization is carried out in the presence of modifying agents. The general function of modifiers is to eliminate or substantially reduce the formation between polymer units of cross-linkages leading to the production of gel-type products which render the polymerizates tough, hard and generally refractory toward subsequent process operations. Further beneficial effects of modifying agents are frequently manifested in increased polymerization rates. The most effective modifying agents heretofore known to the art have been selected alkyl mercaptans and especially the primary alkyl mercaptans having about 12 carbon atoms per molecule.

It has now been found that tertiary alkyl mercaptans, especially those selected from the group having 8 to 16 carbon atoms per molecule, have a comparable beneficial modifying effect on Buna-S polymerizates. Unexpectedly, however, we have found that blends of two or more selected tertiary mercaptans from the above group exert a modifying action superior in over-all effect to any of the individual mercaptans included in the blends. The polymerizates prepared in the presence of our novel blended modifier compositions are more uniform with respect to molecular weight range and therefore have properties which are superior to those of polymerizates modified in the conventional manner. Thus when a modifier of uniform carbon content is employed, the rate of depletion of modifier is such than an overmodified polymer of inadequate chain length is produced in the early stages of polymerization. Since excessive quantities of modifier have been consumed, cross linking sets in during the final phase of polymerization as is evidenced by a very rapid rise in average molecular weight. Although both over- and under-modification have resulted, the average molecular weight of the final product is sufficiently high to permit processing operations; however, such polymers have poor aging properties. This lack of control over the rate of reaction of modifier results in a product containing a proportion of polymer of objectionably low molecular weight and another portion having excessively high values. With the blended modifiers of the present invention, the above objections are overcome due to the fact that the mercaptan components are consumed at different rates. The net effect of our blended modifiers is to produce a relatively uniform modification with elimination of cross linking during the later stages of polymerization. Thus, finished polymer of the same average molecular weight is much more homogeneous when modified with a blend of mercaptans of different molecular weights than would be the case if any one component of the blend were used alone. In this manner, we are able to control the average molecular weight of the polymer at all stages of conversion and thereby effect a substantial improvement in the quality of the product.

An object of this invention is to provide a novel process for the production of high molecular weight polymers.

Another object is to provide an improved process for polymerization of polymerizable organic compounds in an aqueous emulsion.

Still another object is to provide such a process which is particularly useful for the production of polymerizates of the Buna-S type.

A further object is to provide such a process in which a blend of two or more tertiary aliphatic mercaptans is used as a modifier for the polymerization.

In one embodiment of the present invention, a conventional polymerization recipe is employed.

| Component | Parts by wt. |
|---|---|
| Butadiene | 75 |
| Styrene | 25 |
| Soap | 5 |
| Potassium persulfate | 0.3 |
| Water | 180 |
| Mercaptan | Variable. |

Temperature 50° C.

The quantity of modifier used in any recipe is dependent on the type of mercaptan or mercaptans used and is determined by experiment. For example, to obtain an acceptable polymerizate for use in synthetic rubber with a Mooney viscosity of 45–55 the conversion is stopped at about 77 per cent of the monomer charge. These conditions are selected to give a gel-free polymeric product having an adequately high average molecular weight. The quantity of modifier is, therefore, determined by these criteria. Excessive quantities of modifier require higher conversions in order to realize the specified Mooney viscosity; however, when this is done a polymer may be obtained which is not readily amenable to the rubber compounding and vulcanization operations. It can be seen, therefore, that the quantity of any given mercaptan modifier must be carefully controlled within somewhat narrow limits.

Application of individual tertiary mercaptans as modifiers in the standard GR-S recipe is suitably accomplished in the following generalized procedure. An emulsion of the recipe ingredients along with the necessary quantity of modifier is agitated for 12 hours at 50° C. The resultant latex is treated with phenyl-beta-naphthylamine antioxidant followed by coagulation. The crude polymer is washed and dried in preparation for evaluation and/or subsequent process steps. In this manner, gel-free products meeting the criteria of monomer conversion, Mooney viscosity and processability are obtained with the following tertiary aliphatic mercaptans:

| Modifier | Parts by wt. |
|---|---|
| t-octyl mercaptans | 0.20 |
| t-dodecyl mercaptans | 0.28 |
| t-tetradecyl mercaptans | 0.34 |

The above identified mercaptans are derived from mixtures of isomeric olefins by direct catalytic condensation with hydrogen sulfide. The so-called "t-octyl mercaptans," for example, are comprised of many different isomers having 8 carbon atoms per molecule. We have found that such fractions of narrow boiling range tend to behave as a single mercaptan when used as a polymerization modifier. The same condition is true of the t-dodecyl and t-tetradecyl mercaptans listed above. In order to specifically define the synthetic tertiary aliphatic mercaptans of this invention, physical properties of selected molecular weight groups are given in the subjoined tabulation:

| t-Mercaptans | $C_8$ | $C_{12}$ | $C_{14}$ | $C_{16}$ |
|---|---|---|---|---|
| Sp. gravity at 60° F./60° F. | 0.856 | 0.871 | 0.877 | 0.883 |
| Av. molecular weight | 145 | 193.3 | 230 | 249 |
| RSH sulfur, wt. per cent | 21.6 | 15.9 | 11.9 | 10.3 |
| RSH purity, wt. per cent | 97+ | 96.8 | 85.6 | 80 |
| Distillation, °F | [1] (760 mm.) | [2] (5 mm.) | [2] (5 mm.) | [2] (5 mm.) |
| Initial | 301 | 177 | 218 | 252 |
| 50% cond | 319 | 195 | 237 | 267 |
| 80% cond | 324 | 202 | | 287 |
| 90% cond | 328 | 206 | 247 | 305 |
| 95% cond | 333 | 212 | 252 | dec. |

[1] ASTM D86-40.
[2] Rubber Reserve Company Test Method L. M. 2.5.6.

While the preceding representative mercaptan fractions exert a modifying action comparable with other commercial modifiers, we have now found that polymers of superior characteristics can be realized by utilizing blends of our tertiary mercaptans to give a modifier of variable carbon content. The modifying effect of these blends is such as to result in polymer characteristics entirely different from the effect that could be predicted from the individual behavior of the blend components. The reason for this synergism in modifying action is not known, but it is apparently related in some obscure fashion to relative reaction rates. By virtue of this newly discovered method of proper blending of tertiary mercaptans, we are now able to obtain a smooth rate of modification throughout the entire polymerization period. Under the conditions used heretofore, where a non-uniform rate of modifier depletion occurs, the polymer product represents a combination of over-modified and under-modified components. It is obvious that a more homogeneous polymer, of the same average molecular weight as obtained with previous unitary modifiers, could be produced by simply increasing the polymer size in the early stages of polymerization and eliminating to a large extent the extremely high molecular weight material ordinarily produced in the latter stages of polymerization. In this connection it has been shown by Kemp and Straitiff (Ind. Eng. Chem. 36, 707 (1944)) that the most desirable polymers of the Buna-S type are those which do not contain large amounts of material of either very high or very low molecular weight. That our blended modifiers tend to produce a more uniform product is attested by data to be presented later wherein the ratio of polymer molecular weights at various stages of conversion to that of the final product are compared with similar data derived from experiments using conventional unitary modifiers.

In order to demonstrate the improved results attributable to our blends of specified tertiary mercaptans, comparable polymerization experiments were carried out using as modifiers the fractionated samples of $C_8$, $C_{12}$, $C_{14}$ and $C_{16}$ tertiary mercaptans previously described. The results obtained with the individual unit modifiers were then compared with experiments wherein blends of the mercaptan fractions were used for the same purpose. In each test run, the standard GR-S recipe was employed along with sufficient added modifier to result in about 77 per cent conversion of monomers to polymer, having a Mooney viscosity of 45-55. In experiments involving non-blended modifier, the proportions of mercaptan are those previously given. The difference in behavior of the various modifiers during the progress of the polymerization was followed by periodic withdrawal of samples to determine extent of conversion and intrinsic viscosity of the product polymer. Since intrinsic viscosity is a measure of molecular weight (cf. Kemp and Peters, Ind. Eng. Chem., 23, 1263 (1941)), the experimental results may be reported in terms of average molecular weights of polymer through the use of a simple mathematical relationship.

TABLE I

*Variation in molecular weights of GR-S polymers modified with various tertiary mercaptan compositions*

| Monomer Conversion | Average Molecular Weight of Polymer Samples | | | |
| --- | --- | --- | --- | --- |
| | 50% | 60% | 70% | 77% |
| Modifiers: | | | | |
| $C_8$ tert. mercaptan | 117,000 | 182,000 | 328,000 | 345,000 |
| $C_{12}$ tert. mercaptan | 106,000 | 139,000 | 237,000 | 343,000 |
| $C_{14}$ tert. mercaptan | 142,000 | 172,000 | 214,000 | 343,000 |
| $C_8$, $C_{12}$, $C_{14}$ mercaptan blend [1] | 152,000 | 224,000 | 328,000 | 352,000 |

[1] The blend composition consisted of 1 part $C_8$, 2 parts $C_{12}$ and 2 parts $C_{14}$ tert. mercaptans.

In the critical polymerization range lying between 50 and 77 per cent conversion of monomers, the rapid transition from relatively low to relatively high molecular weight polymers has been greatly reduced by the use of blended modifiers without reducing the ultimate average molecular weight. The results achieved through the use of our blended modifiers are even more striking when the above data are presented in such a form as to show the actual data obtained with blended mercaptans in comparison with a calculated expected average effect. Thus, knowing the proportion of each mercaptan in the three component blend, the effect of each component on the molecular weight of GR-S polymer, and assuming that each component exerts its own modifying action without synergistic action, a hypothetical set of data similar to that of Table I can be calculated. Such calculated data are presented in Table II along with data obtained using the actual blend. Inspection of the table reveals the unexpected and beneficial synergistic action of the blended tertiary mercaptans.

TABLE II

*Comparison of predicted and actual modifying action of blended t-mercaptans*

| Monomer conversion | Average Molecular Weight of Polymers | | | |
| --- | --- | --- | --- | --- |
| | 50% | 60% | 70% | 77% |
| Hypothetical Mercaptan blend [1] | 123,000 | 161,000 | 246,000 | 343,000 |
| Actual Mercaptan blend [1] | 152,000 | 224,000 | 328,000 | 352,000 |

[1] 1 part $C_8$, 2 parts $C_{12}$, 2 parts $C_{14}$ tert. mercaptans.

The most outstanding contribution to the polymerization art of our blended tertiary mercaptan modifiers is the achievement of a more uniform distribution of polymer sizes thereby improving the characteristics of the polymers with respect to milling, compounding, vulcanization and wearing properties. The improvement in uniformity may be illustrated by expressing the data of Table I as percentages of the polymer molecular weight at the termination of polymerization for each separate run.

TABLE III

*Homogeneity of modified polymer product expressed as percentage of final molecular weight*

| Monomer Conversion | 50% | 60% | 70% | 77% |
| --- | --- | --- | --- | --- |
| Modifiers: | | | | |
| $C_8$ tert. mercaptans | 34.0 | 52.8 | 95.0 | 100 |
| $C_{12}$ tert. mercaptans | 34.0 | 40.6 | 69.2 | 100 |
| $C_{14}$ tert. mercaptans | 41.5 | 50.2 | 62.5 | 100 |
| $C_8$, $C_{12}$, $C_{14}$ mercaptan blend [1] | 43.3 | 63.8 | 95.6 | 100 |

[1] 1 part $C_8$, 2 parts $C_{12}$, 2 parts $C_{14}$ tert. mercaptans.

From the above table it can be seen that polymers modified with our mercaptan blend have a higher molecular weight with respect to the finished product than any of the samples modified with the individual components of the blend. This effect is even more striking and unexpected when the modifying effect of the individual mercaptans is averaged in proportion to the amount of each modifier in the actual blend. Table IV presents a comparison of the uniformity of a polymer product actually modified with a blended modifier with a hypothetical case.

TABLE IV

*Homogeneity of modified GR-S polymers. Calculated versus experimental values*

| Monomer Conversion | Percentage of Final Molecular Weight | | | |
| --- | --- | --- | --- | --- |
| | 50% | 60% | 70% | 77% |
| Hypothetical mercaptan blend | 35.9 | 47.0 | 71.8 | 100 |
| Experimental mercaptan blend | 43.3 | 63.8 | 95.6 | 100 |

By way of further illustration of the unexpected results achieved with the ternary mixture of tertiary mercaptans, Figures 1 and 2 show the superiority of the aforesaid mixture over its individual components.

The preferred modifying agents of this process comprise the tertiary aliphatic mercaptans containing from 8 to 16 or more carbon atoms per molecule. While pure individual tertiary mercaptans are not excluded, such compounds are ordinarily not available. The most abundant and practical source of tertiary mercaptans is from the catalytic addition of hydrogen sulfide to olefinic polymers such as may be derived from catalytic polymerization of refinery $C_3$, $C_4$ and $C_5$ olefins. These olefinic polymers are fractionated into narrow boiling-range cuts corresponding in average molecular weight to octenes, nonenes, decenes, undecenes, dodecenes, etc., prior to conversion to the respective mercaptans. The complexity of isomeric types of the same carbon content in any one fraction virtually precludes commercial isolation of any one pure mercaptan isomer. However, it is known that mercaptan isomers so produced are tertiary in configuration to an extent greater than 95 per cent. While any one of the mercaptan groups such as $C_8$, $C_{12}$, $C_{14}$, $C_{16}$, etc., may be used alone as modifiers, the unusual advantages described herein are realized only when blends of two or more groups of isomers are employed. The direct manufacture of our mercaptan blends from olefins of wide boiling range is precluded because of operational and purification difficulties.

While considerable attention has been given to the modifying effect of ternary blends of tertiary mercaptans it is not to be implied that the novel advantages hereinbefore set forth are limited thereto. In many instances it may be desirable to employ more complex blends while in other cases simple binary mixtures may suffice to give the desired modifying effect. The following examples are appended as illustrating the advantages of our invention with respect to the use of blended modifiers comprising binary mixtures of tertiary aliphatic mercaptans.

EXAMPLE I

The relative modifying activity of individual tertiary $C_{12}$ and $C_{14}$ mercaptans and a blend of these materials was determined under comparable reaction conditions using equivalent quantities of mercaptan in each instance. The test procedure was as follows: a series of emulsions comprising 75 parts butadiene, 25 parts styrene, 5 parts soap flakes, 0.3 part potassium persulfate and 180 parts water was prepared; modifier was added and polymerization effected with constant agitation at 50° C. for variable lengths of time in order to follow the progress of modification with monomer conversion; the polymer was recovered and its intrinsic viscosity was determined. In this manner the effectiveness of tertiary $C_{12}$ and $C_{14}$ mercaptans was compared with a 68-32 blend of the respective mercaptans, i. e., 68 parts by weight of the $C_{12}$ mercaptan admixed with 32 parts by weight of the $C_{14}$ mercaptan. The quantities of modifier employed in these runs were as follows:

| Modifier | Parts by wt. |
|---|---|
| $C_{12}$ t-mercaptan | 0.28 |
| $C_{14}$ t-mercaptan | 0.40 |
| $C_{12}$-$C_{14}$ blend | 0.31 |

The general results of these tests and the superiority of the blended modifier is illustrated in Figure 3 where polymer intrinsic viscosities are plotted against extent of monomer conversion. Over the critical region most apt to give crosslinked and inferior polymers it is noted that the curve representing polymer modified with the binary blend shows a higher intrinsic viscosity and therefore higher molecular weight for a given conversion than either of the products modified with the blend components. This reduction in slope of the viscosity-conversion curve with the same ultimate average molecular weight resulted in a more uniform product of superior processing and wearing properties.

EXAMPLE II

Employing the technique of Example I and the same basic recipe, the modifying action of individual tertiary $C_{12}$ and $C_{16}$ mercaptans was compared with a 56-44 blend, respectively, of these mercaptans. The following amounts of modifier were used in the three series of tests:

| Modifier | Parts by wt. |
|---|---|
| $C_{12}$ tert. mercaptans | 0.28 |
| $C_{16}$ tert. mercaptans | 0.45 |
| $C_{12}$-$C_{16}$ blend | 0.36 |

Figure 4 represents a graphical presentation of data relative to polymer modified with the blend and with the $C_{12}$ mercaptans alone. It can be seen that the polymer modified with the blend has higher intrinsic viscosity and therefore higher molecular weight at low conversion than polymer modified with $C_{12}$ mercaptans alone. As in the previous example, a more uniform and more desirable product was prepared. A curve for polymer modified with $C_{16}$ mercaptans could not be constructed since none of the polymer was sufficiently modified to be completely soluble in benzene. Thus, in spite of the fact that a relatively large amount of $C_{16}$ mercaptan modifier was employed, gel formation was pronounced throughout the polymerization period. However, when this $C_{16}$ tertiary mercaptan is admixed with $C_{12}$ tertiary mercaptan, a highly satisfactory and superior modifying agent results.

We claim:

In a process for the production of a modified copolymer of butadiene and styrene in an aqueous emulsion, the improvement which comprises the addition as a modifier of a blend of mixtures of isomeric tertiary aliphatic mercaptans of uniform molecular weight, said blend containing substantially the following proportions by weight: one part of a mixture of tertiary octyl mercaptans, two parts of a mixture of tertiary dodecyl mercaptans, and two parts of a mixture of tertiary tetradecyl mercaptans, to the butadiene and styrene prior to polymerization.

WILLIE W. CROUCH.
EDWIN G. MARHOFER.

No references cited.